(12) United States Patent
Petersen et al.

(10) Patent No.: US 11,733,774 B2
(45) Date of Patent: Aug. 22, 2023

(54) EYE-TRACKING ARRANGEMENT

(71) Applicants: Robert Bosch GmbH, Stuttgart (DE); TRUMPF Photonic Components GmbH, Ulm (DE)

(72) Inventors: Andreas Petersen, Stuttgart (DE); Thomas Alexander Schlebusch, Stuttgart (DE); Hans Spruit, Ulm (DE); Jochen Hellmig, Ulm (DE)

(73) Assignees: ROBERT BOSCH GMBH, Stuttgart (DE); TRUMPF PHOTONIC COMPONENTS GMBH, Ulm (DE)

( * ) Notice: Subject to any disclaimer, the term of this patent is extended or adjusted under 35 U.S.C. 154(b) by 0 days.

(21) Appl. No.: 17/451,219

(22) Filed: Oct. 18, 2021

(65) Prior Publication Data
US 2022/0121279 A1    Apr. 21, 2022

(30) Foreign Application Priority Data
Oct. 20, 2020    (DE) .......................... 102020127593.5

(51) Int. Cl.
*G06F 3/01*    (2006.01)
*G06V 40/19*    (2022.01)

(52) U.S. Cl.
CPC .............. *G06F 3/013* (2013.01); *G06V 40/19* (2022.01)

(58) Field of Classification Search
CPC ........... G02B 27/0093; G02B 27/0172; G02B 2027/0178; G02B 27/0179; G02B 27/1006; G02B 2027/0138; G02B 2027/014; G02B 2027/0187; G02C 11/10; G06F 3/013; G06V 40/19; G06V 40/193; A61B 3/113; G01P 3/36; G01P 3/366; G01S 17/34; G01S 17/58; G01S 17/66; G01S 17/88; G01S 7/4815
See application file for complete search history.

(56) References Cited

U.S. PATENT DOCUMENTS

| | | | |
|---|---|---|---|
| 2016/0270656 A1* | 9/2016 | Samec ............... | G02B 27/0179 |
| 2017/0261610 A1* | 9/2017 | Scally ...................... | G01S 15/50 |
| 2020/0008671 A1 | 1/2020 | Sebastian et al. | |
| 2020/0026350 A1* | 1/2020 | Eash ........................ | G06F 3/011 |
| 2022/0079675 A1* | 3/2022 | Lang ....................... | G02B 30/52 |

FOREIGN PATENT DOCUMENTS

JP    2000325312 A    11/2000

OTHER PUBLICATIONS

Pruijmboom, VCSEL-based miniature laser-Doppler interferometer, 2008 (Year: 2008).*
Search Report from corresponding DE Application No. 10 2020 127 593.5 dated Jun. 22, 2021, 7 pages.
"Doppler Effect", 2021, <https://www.radartutorial.eu/11.coherent/co06.de.html>.

* cited by examiner

*Primary Examiner* — Nelson M Rosario
(74) *Attorney, Agent, or Firm* — Tucker Ellis LLP

(57) ABSTRACT

The invention relates to an eye tracking arrangement that includes a camera configured to capture images of an eye at a first scanning rate, a laser velocimeter configured to capture an eye velocity of a movement of the eye by laser Doppler velocimetry at a second scanning rate and a control device configured to determine an absolute eye position based on the images, and track a gaze direction of the eye based on the absolute eye position and the eye velocity.

15 Claims, 2 Drawing Sheets

EYE-TRACKING ARRANGEMENT

RELATED APPLICATION DATA

This application claims priority to and benefit of German Application No. DE 102020127593.5 filed Oct. 20, 2020, the entirety of which is incorporated herein by reference.

FIELD OF THE INVENTION

The present invention relates to an eye tracking arrangement, smart glasses and a method for eye tracking of an eye.

BACKGROUND OF THE INVENTION

It is known that eye tracking is used to determine eye movements and to estimate the direction of gaze. Known systems are based on acquisition of information about the eye position using camera-based systems or electrical or electromagnetic sensors in the region of the eye. In addition, scanned laser systems are known which, for example, use micromirrors to scan a laser spot across the eye. All of these systems typically have high complexity and high energy consumption with usually limited temporal resolution.

SUMMARY OF THE INVENTION

In contrast, the eye tracking arrangement according to the invention having the features of claim 1 is characterized by incorporating a particularly energy-saving, cost-effective and temporally high-resolution eye tracking option. This is achieved by an eye tracking arrangement comprising a camera, a laser velocimeter, and a control device. The camera is arranged to capture images of an eye at a first scanning rate. The laser velocimeter is arranged to detect an eye velocity using laser Doppler velocimetry. When using laser Doppler velocimetry, the laser velocimeter is configured to detect the eye velocity with a second scanning rate. The control device is configured to determine an absolute eye position in each case based on the images captured by means of the camera. Furthermore, the control device is configured to track a direction of gaze of the eye based on the absolute eye positions determined and based on the eye velocity determined by the laser velocimeter.

A laser velocimeter is especially a laser device that is configured to irradiate a, preferably wavelength-modulated, laser beam onto the eye and to determine a Doppler shift between the irradiated laser beam and the backscattered portion based on a laser feedback interferometry of the irradiated laser beam with a portion of the irradiated laser beam backscattered by the eye. Furthermore, this laser device is especially designed for determining the eye velocity of the eye based on the determined Doppler shift.

In this context, an eye velocity is considered to be a tangential velocity of a point on the surface of the eye, this point corresponding to the point where a laser beam irradiated from the laser velocimeter impinges on the surface of the eye.

Preferably, the eye velocity comprises an absolute value for the current velocity, as well as a direction of the current velocity.

Based on the determined absolute eye position, as well as based on the determined eye velocity, the eye movement of the eye can thus be tracked. A gaze movement is considered to be a change in a direction of gaze, especially in relation to a head. Preferably, a gaze movement corresponds to a rotation of the eye, especially of the eyeball, in the eye socket. In other words, starting from a known absolute eye position, the gaze direction can be tracked according to movements of the eye. The eye tracking arrangement thus allows precise tracking of the eye's gaze movements in a particularly simple and efficient manner. The specific method of determining the direction of gaze using the laser velocimeter, especially the Doppler effect, offers the advantage of particularly high temporal scanning rate, allowing particularly high-resolution temporal tracking of the eye movements.

The combination of camera and laser velocimeter is particularly advantageous for tracking the gaze direction of the eye, which, on the one hand, is characterized by high absolute accuracy, and on the other hand by high temporal resolution with overall low energy consumption.

In addition, the eye tracking arrangement offers the advantage of allowing use of simple and inexpensive components and evaluation algorithms with low energy requirements. In addition, it is advantageous that no moving components, such as scanning devices, are required, providing particularly flexible and reliable applicabilities.

Preferred further embodiments of the invention are the subject matter of the subordinate claims.

Preferably, the first scanning rate is 40 Hz at the maximum, especially at least 1 Hz, preferably at least 5 Hz, particularly preferably exactly 5 Hz. Particularly preferably, the second scanning rate is at least 500 Hz, preferably 5 kHz at the maximum. Especially, the second scanning rate consequently is a multiple of the first scanning rate. For example, the first scanning rate can be kept low herein, for example 5 Hz, which means 5 frames per second, to maintain a low level of computationally intensive image processing and thus power consumption. Using the laser velocimeter, which is characterized by particularly low power consumption and little computing capacity requirement, the eye movement can be tracked with particularly high resolution.

Particularly preferably, the laser velocimeter has at least one surface emitter (also called vertical-cavity surface-emitting laser, or VCSEL for short) including an integrated photodiode. With such a laser velocimeter, the eye movements can be recorded using a particularly simple, compact and cost-effective design of the eye tracking arrangement based on laser Doppler velocimetry. In particular, the laser velocimeter is suitable for detection using the self-mixing effect. Preferably, the photodiode is used to detect the superposition of the irradiated laser beam with the backscattered component directly within the laser cavity. Particularly preferably, the laser velocimeter may be comprise several surface emitters, each of which emits a laser beam.

Furthermore, the object of the invention is a smart glasses comprising the eye tracking arrangement described above. Preferably, the smart glasses are a wearable device configured to be worn on a user's head. Herein, the possibility of the eye-tracking arrangement being operable in a power-saving manner has a particularly advantageous effect, for example enabling low weight and/or a long operating time of the smart glasses and thus high user convenience when using a battery-driven eye-tracking arrangement.

Preferably, the laser velocimeter has at least one laser source which is arranged on a spectacle frame and/or on a spectacle temple. In this context, a frame is especially considered to be a region of the smart glasses surrounding a lens, whereas a temple is especially considered to be a holding temple connected to the frame and extending, for example, to an ear of the user. For example, several laser sources can be arranged distributed around the eyeglass lens on the eyeglass frame, thereby enabling particularly precise scanning of the eye across its entire range of motion. An arrangement of one or more laser sources in the spectacle frame below the spectacle lens is particularly advantageous. Alternatively or additionally, one or more laser sources may be integrated, preferably molded, into the spectacle lens. Alternatively or additionally, the camera is preferably arranged on the spectacle frame, and/or on the spectacle temple and/or in the spectacle lens.

Preferably, the smart glasses further comprise an input and/or output unit, which is arranged to receive an input from the user and/or to output an output to the user. Preferably, the input and/or output unit comprises a projection device arranged to project an image, especially onto a retina of the user's eye. Preferably, the input and/or output unit and the eye tracking arrangement are coupled to each other, especially via the control device of the eye tracking arrangement, so that especially the input and/or output unit can be controlled depending on the eye movements of the eye. This enables particularly user-friendly operation of the smart glasses, wherein the specific type of gaze tracking can provide high level of precision and simultaneously particularly low energy consumption as well as low costs.

Furthermore, the object of the invention is to provide a method for eye tracking of an eye, comprising the steps of:
- capturing an image of the eye using a camera,
- determining an absolute eye position of the eye based on the captured image of the eye,
- irradiating at least one wavelength modulated laser beam onto the eye,
- determining a Doppler shift between the irradiated laser beam and a backscattered portion of the irradiated laser beam from the eye based on laser feedback interferometry of the irradiated laser beam and the backscattered portion from the eye,
- determining an eye velocity based on the Doppler shift, and
- tracking a gaze movement of the eye based on the absolute eye position and the eye velocity.

In other words, in the method, at least one image of the eye is captured using a camera, based on which image an instantaneous absolute eye position is determined. In addition, at least one wavelength-modulated laser beam, which is emitted especially by a wavelength-modulated laser source, is irradiated onto the eye of the user. The irradiated laser beam is at least partially backscattered at an ocular surface of the eye. The backscattered portion of the irradiated laser beam is considered to be that portion of the irradiated laser beam scattered at the ocular surface which is parallel to the emitted laser beam and propagating from the eye in the direction of a laser source of the irradiated laser beam. The backscattered portion is thus superimposed on the incident laser beam. The backscattered portion of the irradiated laser beam can also be referred to as backscattered radiation. Especially the backscattered portion corresponds to a laser beam of the irradiated laser beam reflected at the eye. This backscattered portion interferes with the incident laser beam, i.e. with the incident laser beam propagating toward the eye. The incident laser beam is superimposed on the backscattered portion, resulting in interference radiation. This resulting interference radiation can be detected and analyzed using a detector, for example.

In this context, laser feedback interferometry is considered to be a detection and analysis of any superposition of the irradiated laser beam with the backscattered component of the irradiated laser beam, i.e. a detection and analysis of a resulting interference radiation. Preferably, an optical path length of the irradiated laser beam is determined based on the laser feedback interferometry. The optical path length is considered to be the product of a geometric distance covered by the irradiated laser beam from the laser source to the ocular surface and a refractive index of the material present therein. This means that if the laser beam is irradiated in air (refractive index approx. 1) from a laser source directly onto the eye, the optical path length corresponds in a very good approximation to the distance between the laser source and the eye. If the wavelength of the irradiated laser beam is known, the optical path length can be estimated, for example, based on constructive or destructive interference.

Preferably, laser light triangle-modulated in the wavelength is emitted as the irradiated laser beam. The optical path length can be determined by laser feedback interferometry, i.e. by analyzing the interference of the irradiated laser beam and the backscattered portion of the irradiated laser beam, especially by calculating an average of the resulting interference frequencies with respect to the two edges of the triangle-modulated signal.

Furthermore, if there is any movement of the eye in relation to the irradiated laser beam, a Doppler shift occurs due to the Doppler effect, especially between the frequencies, of the irradiated laser beam and the backscattered portion. This Doppler shift can be detected by laser feedback interferometry. The Doppler shift can then be used to determine the eye velocity. Using the absolute eye position and the eye velocity determined, the direction of gaze of the eye can then be tracked. In particular, starting from a known eye position, the direction of gaze can be tracked after movements of the eye. The method thus allows precise tracking of the eye's gaze movements in a particularly simple and efficient manner. The specific method of determining the eye velocity using laser feedback interferometry, especially based on the Doppler effect, offers the advantage of a particularly high temporal scanning rate, allowing temporally particularly high-resolution tracking of the eye movements. Determination of absolute positions of the eye at certain points in time can easily and very precisely be achieved using the camera images. In addition, the method offers the advantage that simple and inexpensive components and evaluation algorithms, which have a low energy requirement, can be used. Furthermore, it is advantageous that no moving components, such as scanning devices, are required, thus providing particularly flexible and robust applicabilities.

Preferably, images of the eye are captured at a first scanning rate to determine absolute eye positions at the first scanning rate. Wavelength modulated laser beams are irradiated onto the eye at a second scanning rate to determine eye velocities at the second scanning rate. Preferably, the second scanning rate is a multiple of the first scanning rate. Particularly preferably, the first scanning rate is 40 Hz at the maximum, especially at least 1 Hz, preferably 5 Hz. Preferably, the second scanning rate is at least 500 Hz, more preferably 5 kHz at the maximum.

Particularly preferably, the tracking of the eye movement is performed starting from an absolute eye position determined based on the image captured by the camera, and additionally determining interpolated eye positions based on the eye velocity determined. In other words, the current absolute eye position is determined based on exactly one image captured by the camera. Based on this determined absolute eye position, the eye movement of the eye is then tracked using the eye velocity determined by laser Doppler velocimetry, especially using the direction and magnitude of the eye velocity. This means that the current absolute eye position can be estimated with a high degree of accuracy at any time, even if no image of the eye is currently available or the last image acquired was taken a long time ago.

Preferably, the eye velocity is determined based on the equation: $F_D = 2 v \cos(\alpha)/\lambda$. Where $\lambda$ is the wavelength of the incident laser beam, v is the eye velocity, $F_D$ is the Doppler shift between the incident laser beam and the backscattered portion of the incident laser beam, and $\alpha$ is an angle between a wave vector k of the incident laser beam and a tangent line, which touches the ocular surface at an incidence point at which the irradiated laser beam impinges on the eye and which additionally is located in the plane spanned by the wave vector k and the surface normal at the incidence point. In particular, the Doppler shift FD corresponds to an amount of the difference between the frequency of the irradiated laser beam and the frequency of the back-radiated portion of the irradiated laser beam. Using the above equation, the eye velocity can be determined with particularly low computational effort to be able to determine the eye movement efficiently and with high resolution.

Preferably, the method furthermore comprises the step of a calibration by determining the angle $\alpha$. The angle $\alpha$ is determined based on the image of the eye captured by the camera, while at the same time the wavelength-modulated laser beam is irradiated onto the eye. In particular, herein the laser beam impinging on the surface of the eye is detected based on the image captured by the camera, and the angle $\alpha$ is estimated based on a known geometry or relative arrangement of laser velocimeter and camera and eye. Preferably, this step of calibration will regularly be performed to always obtain precise measurement results when determining the eye velocity. For example, the calibration may be performed using each image captured by the camera, alternatively the calibration may be performed regularly at predefined time intervals, for example at time intervals of 10 seconds, or 30 seconds, or 1 minute.

Preferably, the method further comprises the steps of:
determining a calibration eye velocity based on at least two consecutive images; and
calibrating by determining the angle $\alpha$, wherein the angle $\alpha$ is determined based on the calibration eye velocity determined. In other words, determination of the calibration eye velocity is performed based on at least two consecutive images captured by the camera. Especially, determination based on the so-called optical flow will be performed Preferably, the relative movement of the eye between the two images is estimated by comparing the respective instantaneous absolute eye positions. Based on this calibration eye velocity, the angle $\alpha$ can then be estimated to calibrate the laser velocimeter. Preferably, for this purpose, the laser velocimeter is operated simultaneously with the determination of the calibration eye velocity to determine an eye velocity during this eye movement in between the two acquired images. Based on these two determined eye velocities, i.e. on the calibration eye velocity and the eye velocity determined by the laser velocimeter, the actual angle $\alpha$ can then be calibrated, for example can iteratively be adjusted. Preferably, this calibration procedure may be performed once, for example when the smart glasses are put into operation.

Preferably, the method further comprises the steps of: determining a maximum eye velocity during an eye movement, and predicting an eye movement end position based on the maximum velocity. The eye movement end position is defined by the position where the eye movement stops. Preferably, when the eye movement end position is reached, there is no relative movement of the eye to the head. Thus, in case of rapid eye movements, so-called saccades, it can be predicted at which position the eye movement will stop. Preferably, prediction of the eye movement end position is performed based on the assumption that the eye performs uniformly accelerated movement during such eye movement. That is, constant positive acceleration is present in a first half of such eye movement, while constant negative acceleration, especially of the same magnitude, is present in the second half of the eye movement. By detecting the first half of a corresponding velocity curve, i.e. the velocity of the eye movement starting from standstill up to the maximum velocity during the movement, the second half of the velocity curve can be estimated, especially based on the assumption of mirror symmetry. This allows the end point of the eye movement to be estimated, especially by integration of the determined velocity curve. Preferably, determination of the maximum velocity during the eye movement is based on detecting a decreasing eye velocity following increase of eye velocity. In the present method, determination of the eye movement end position is particularly advantageously enabled by the particularly high-resolution velocity detection using the laser velocimeter with high accuracy.

Preferably, at least two laser beams are irradiated onto the eye, the two laser beams being aligned such that an angle and/or a distance between a wave vector of each irradiated laser beam and in each case at least one of two mutually orthogonal rotational axes is not equal to zero. In order to detect a rotational movement of the eye about a rotational axis, it is advantageous for the wave vector of the irradiated laser beam to enclose a maximally large angle with the rotational axis and at the same time being maximally spaced apart therefrom. For example, if the distance and/or the angle enclosed with the rotational axis are equal to zero, the irradiated laser beam is not sensitive to a rotational movement about this axis. According to this relation, in other words, it is advantageous if the two irradiated laser beams are aligned such that each of them is particularly sensitive to one of the rotational rates of rotations of the eye about two mutually orthogonal rotational axes. Preferably, in the particular case when both laser beams arrive at the same point on the surface of the eye, the laser beams are aligned so that projections of the two irradiated laser beams onto a tangential plane at the eye and at the point of impact are orthogonal to each other. That means, in this case, the portions of the two laser beams tangential to the ocular surface are aligned orthogonally to each other at the common point of incidence of the laser beams on the eye. Preferably, the tangential portions of the two laser beams are aligned vertically and horizontally, respectively. Thus, the eye movement in any direction can be determined particularly easily and accurately.

BRIEF DESCRIPTION OF THE DRAWINGS

In the following, the invention will be described by embodiment examples in connection with the figures. In the figures, respective functionally equal components are identified with the same reference signs, wherein.

DETAILED DESCRIPTION OF THE INVENTION

Figure 1:
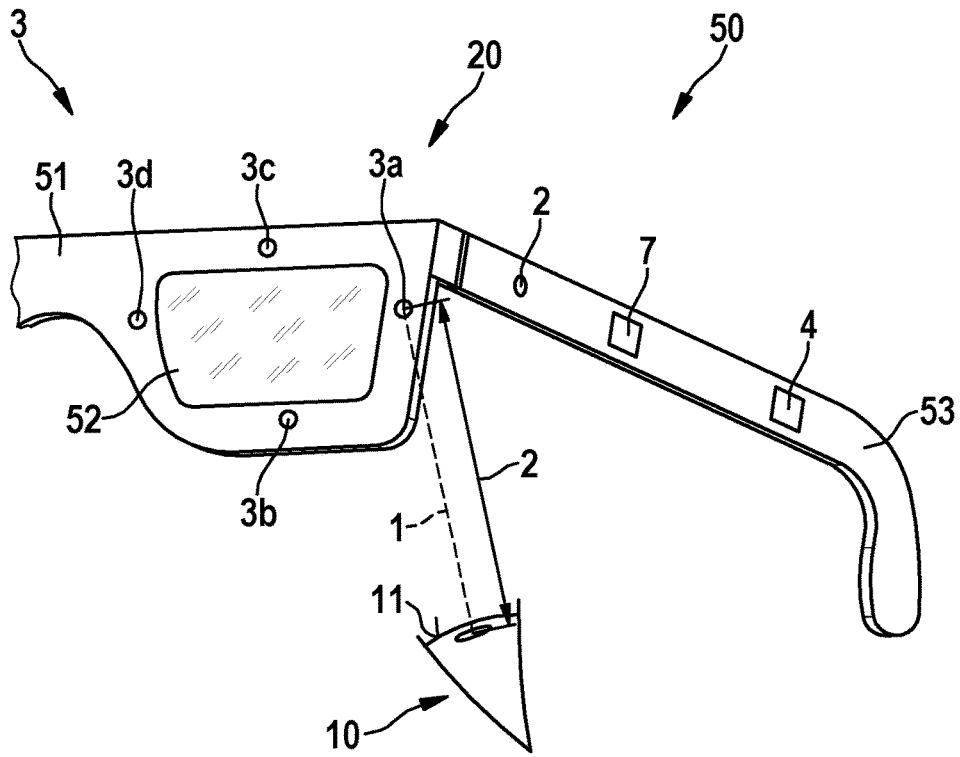
FIG. 1 is a simplified schematic view of a pair of smart glasses according to a first embodiment of the invention.

FIG. 1 shows a simplified schematic view of a pair of smart glasses 50 according to a first embodiment of the invention. The smart glasses 50 comprise a lens 52, a frame 51 in which the lens 52 is received, and a temple 53 for holding the smart glasses 50 on a user's head. The smart glasses 50 are thus provided to be worn on a user's head.

The smart glasses 50 comprise an eye tracking arrangement 20, by means of which a gaze direction of an eye 10 of the user can be determined and tracked. For this purpose, the eye tracking arrangement 20 comprises a camera 2, a laser velocimeter 3, and a control device 4 which is arranged to operate the camera 2 and the laser velocimeter 3 to perform a suitable procedure for determining and tracking the gaze direction of the eye 10.

The control device 4 is arranged in the smart glasses temple 53 to realize compact and ergonomic design of the smart glasses 50. Furthermore, a power supply (not shown), such as a rechargeable battery, may preferably be integrated into the eyeglass temple 53.

The method for determining and tracking the direction of gaze of the eye 10 is performed based on a combined operation of the camera 2 and the laser velocimeter 3, as described below.

Images of the eye 10 will be generated by the camera 2 at a first scanning rate. The control device 4 is arranged to determine an absolute eye position based on the captured images for each image. For example, for this purpose the control device 4 may be configured to detect a pupil 13 and/or an iris 12 of the eye 10 and, based thereon, determine an orientation of the eye 10, especially in relation to a head of the user. Alternatively or additionally, the control device 4 can be configured to identify ellipse parameters from the pupil 13 and/or iris 12 which are distortedly depicted in the image based on the captured image and determine the instantaneous absolute position of the eye 10 based on the ellipse parameters.

In addition to the absolute eye positions determined by the camera 2, eye velocities of the eye 10 are detected using the laser velocimeter 3.

The laser velocimeter 3 comprises a total of four surface emitters 3a, 3b, 3c, 3d as the laser sources, which are arranged on the eyeglass frame 51 distributed around the eyeglass lens 52. Each of the surface emitters 3a, 3b, 3c, 3d is configured to irradiate a wavelength-modulated laser beam 1 onto the eye 10. Herein, triangle-modulated laser light is emitted as the laser beam 1 in the wavelength. For reasons of clarity, only a single laser beam 1 emitted by the first surface emitter 3a is indicated in FIG. 1. Each laser beam 1 is directed in a separate laser spot 30a, 30b, 30c, 30d onto an ocular surface 11 of the eye 10.

Figure 2:
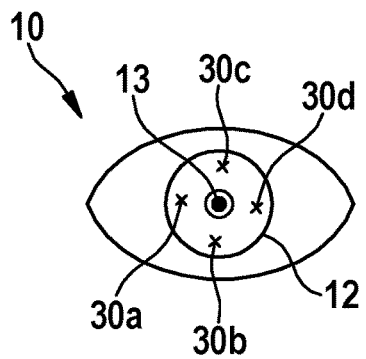
FIG. 2 is a simplified schematic detailed view of a gaze-tracking procedure using the smart glasses of FIG. 1.

FIG. 2 shows the laser spots 30a, 30b, 30c, 30d of the four surface emitters 3a, 3b, 3c, 3d arranged on the eyeglass frame 51.

Figure 3:
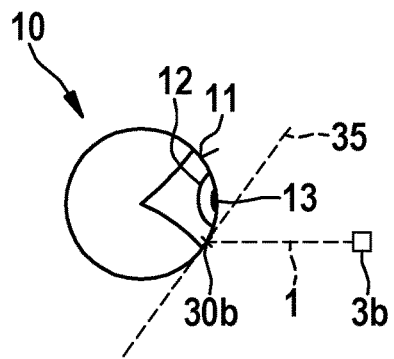
FIG. 3 is another simplified schematic detailed view of the implementation of gaze tracking using the smart glasses of FIG. 1.

As can be seen in FIGS. 2 and 3, the laser spots 30a, 30b, 30c, 30d are preferably located within a region of the iris 12 of the eye 10, for example when looking straight ahead. Alternatively, the laser spots 30a, 30b, 30c, 30d may be located adjacent to that region. As a result, when the eye 10 is moved, the pupil 13 of the eye 10 is frequently moved close to or through the irradiated laser beams 1, so that the position and movement of the pupil 13 can be determined with high accuracy, so as to be able to determine the direction of gaze of the eye 10 with particularly high accuracy.

Implementation of determination of the eye velocity of the eye 10 using the laser velocimeter 3 is described in detail below, wherein in the description reference will be made only to a single laser beam 1.

First, the laser beam 1 is irradiated onto the eye 10. At the eye surface 11, the laser beam 1 is at least partially backscattered, i.e. at least partially reflected. Consequently, superposition of the irradiated laser beam 1 with the portion of the backscattered portion of the irradiated laser beam 1 propagating back in parallel in the direction of the surface emitter 3a occurs. The photodiode integrated in the surface emitter 3a is used to perform laser feedback interferometry to detect the resulting interference radiation, i.e. superposition of the irradiated laser beam 1 and the backscattered radiation propagating in the opposite direction. Since the photodiode is directly integrated into the laser cavity of the surface emitter 3a, detection of the resulting interference radiation will herein be performed using the so-called self-mixing effect.

Figure 4:
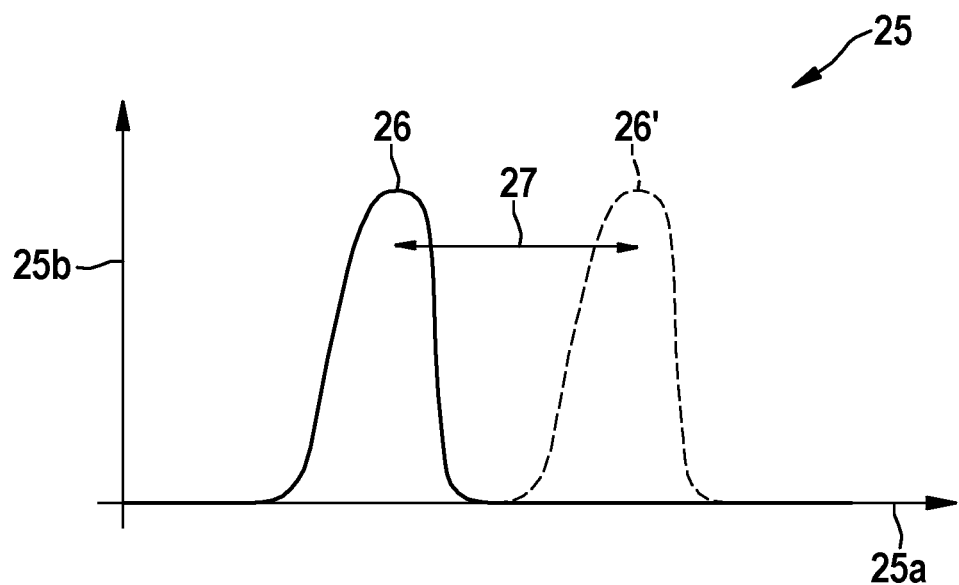
FIG. 4 is a simplified schematic representation of measurement data from the smart glasses of FIG. 1 when performing gaze tracking.

In FIG. 4, an exemplary frequency spectrum 25 of the resulting interference radiation, which can be detected by means of the integrated photodiode of the surface emitter 3a, is schematically shown. The axis 25a corresponds to the frequency and the axis 25b to the amplitude. The reference sign 26 indicates the peak frequency of the detected interference radiation, determined for example using Fourier analysis. Due to the triangular modulation of the wavelength of the irradiated laser beam 1, the peak frequency 26 is dependent on an optical path length 2. The optical path length (cf. FIG. 1), corresponds to a distance which the laser beam 1 covers between the surface emitter 3a and the ocular surface 11. Since the laser beam 1 is irradiated directly onto the eye 10 in the first embodiment of FIG. 1, the optical path length 2 corresponds to the shortest distance between the surface emitter 3a and the eye surface 11. Thus, with a known wavelength of the irradiated laser beam 1, the optical path length 2 can be determined based on laser feedback interferometry for a specific eye position, i.e. for a specific viewing direction.

FIG. 4 shows an exemplary frequency spectrum 25, which is recorded during constant movement of the eye surface 11 in relation to the laser beam 1, i.e. during rotation of the eye 10. During such movement, due to the Doppler effect, a shift 27 of the peak frequency 26 occurs towards a shifted peak frequency 26' shown as a dashed line. The Doppler shift of the emitted and the backscattered laser radiation present herein can thus be determined based on the frequency spectrum 25. Based on this Doppler shift, the instantaneous eye velocity of a movement of the eye 10 as well as a direction of the movement can be determined.

The laser velocimeter 3 is characterized by the fact that very high scanning rate for high-resolution determination of the eye velocity is enabled with particularly low energy consumption. Alternatively, the laser velocimeter 3 allows increase in temporal resolution of the high-precision eye tracking based on the camera 2. This will be achieved by determining the eye movement of the eye 10 between the individual camera images by determining interpolated eye positions based on the detected eye velocity, especially direction and magnitude.

To calculate the eye velocity based on the Doppler shift, an angle α between the eye surface 11 and the laser beam 1 is also determined and taken into account for compensating for an oblique position of the irradiated laser beam 1 in relation to the eye surface 11. In detail, the angle α describes the smallest angle between the laser beam 1 and a plane 35 arranged at the corresponding laser spot 30b tangential to the ocular surface 11 (cf. FIG. 3).

To determine the angle α, calibration can be performed using the camera 2. In a first variant, the angle α can be determined based on the image of the eye 10 captured by the camera 2 while the laser beam 1 is irradiated onto the eye 10. Based on the image captured by the camera 2, the laser beam 1 impinging on the surface of the eye 11 will be detected, i.e. especially the laser spot 30b, and based on a known geometry or relative arrangement of laser velocimeter 3 and camera 2 and eye 10, the angle α is estimated. This first variant of the calibration is preferably performed at regular time intervals during operation of the smart glasses 50.

According to a second variant, the calibration is performed using a calibration eye velocity, which is determined using at least two consecutive images based on determination of an optical flow, i.e. an estimated movement of the eye 10 between the two images. Preferably, for this purpose, the first scanning rate can be temporarily increased, for example to at least 50 Hz. At the same time, the laser velocimeter 3 is used to determine the eye velocity for the period between these two images. For this determination, for example, a value determined from a previous calibration or alternatively any value for the angle α can be used. Preferably, the angle α can subsequently be adjusted by comparing the calibration eye velocity and the eye velocity measured with the laser velocimeter 3.

Preferably, the two variants described above can also be combined. For example, the second variant can be performed once when the smart glasses 50 are put into operation, with the first variant being performed at regular intervals during operation.

Thus, any eye movement can be determined using the eye tracking arrangement 20 based on the laser feedback interferometry, wherein an eye movement of the eye 10 can be determined and tracked. Together with determination of the absolute eye position by the camera 2, which is carried out, for example, only at predetermined times, the current direction of gaze of the eye 10 can be determined and tracked. By using the components required to perform the determination of the direction of gaze, a particularly high temporal resolution of the determination of the direction of gaze may thus be achieved with low energy requirements. Regular evaluation of camera images allows particularly high accuracy of the detection. In addition, particularly low-cost components may be used herein.

The smart glasses 50 further comprise an input and/or output device 7, which is set up to output an output to the user. The input and/or output device 7 comprises a projection unit, which is arranged to project an image onto a retina of the eye 10. The projection unit can be used, for example, to display an augmented reality or virtual reality. Preferably, the projection unit is coupled to the control device 4, wherein the control device 4 is arranged to actuate the projection unit in response to the determined viewing direction. For example, the projected image can be adjusted depending on the viewing direction.

Figure 5:
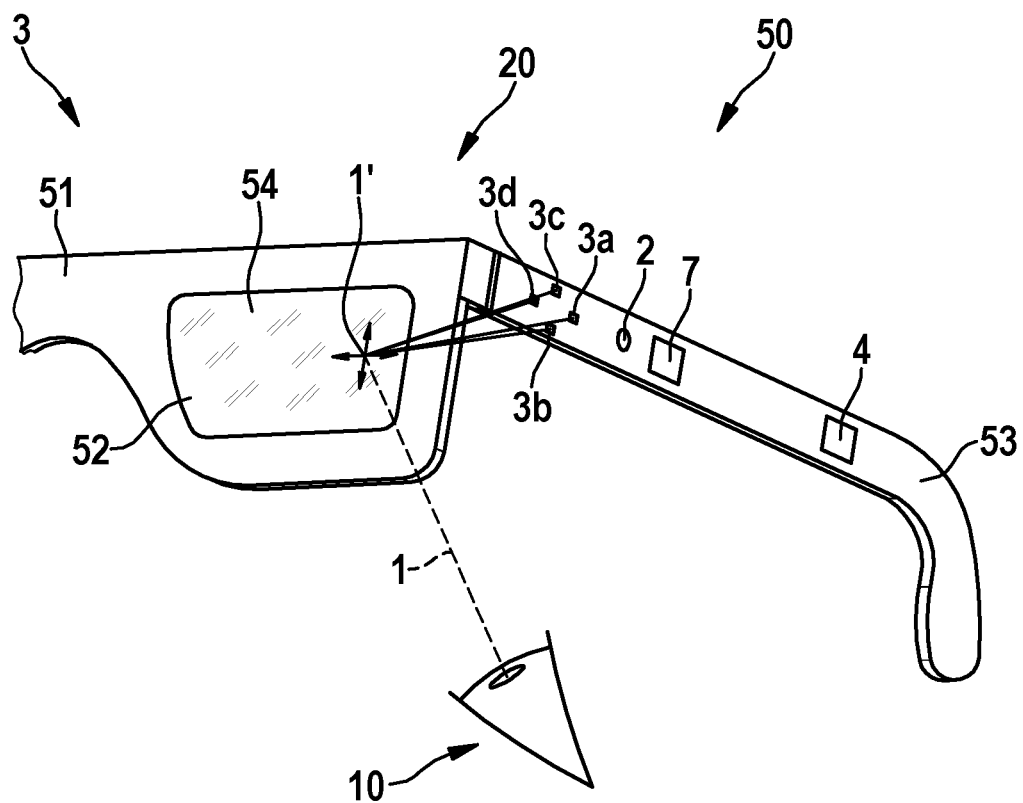
FIG. 5 is a simplified schematic view of smart glasses according to a second embodiment of the invention.

FIG. 5 shows a simplified schematic view of a pair of smart glasses 50 according to a second embodiment example of the invention. The second embodiment example essentially corresponds to the first embodiment example of FIG. 1 only differing in alternatively arranging the laser velocimeter 3. In the second embodiment example of FIG. 5, the laser velocimeter 3 of the gaze detection arrangement 20 comprises four surface emitters 3a, 3b, 3c, 3d with integrated photodiode, which are all arranged on the eyeglass temple 53. The laser beams 1 emitted by the surface emitters 3a, 3b, 3c, 3d are indirectly irradiated onto the eye 10. In detail, the laser beams 1 are irradiated onto the spectacle lens 52, exemplified by a focusing point 1' on the spectacle lens 52. A deflection element 54 in the form of a holographic optical element will thereby be integrated into the spectacle lens 52, which deflects the laser beams 1 towards the eye 10. In this way, an alternative arrangement of the laser velocimeter 3 can be provided, which may as well be used to perform the procedure for determining the direction of gaze.

The invention claimed is:

1. An eye tracking arrangement comprising:
   a camera which is arranged to capture images of an eye at a first scanning rate,
   a laser velocimeter configured to detect an eye velocity of a movement of the eye by laser Doppler velocimetry at a second scanning rate, and
   a control device configured to determine an absolute eye position based on the images, and to track a gaze direction of the eye based on the absolute eye position and the eye velocity, wherein the control device is configured to track the gaze direction starting from the absolute eye position determined based on the image and by determining interpolated eye positions based on the determined eye velocity.

2. The eye tracking arrangement according to claim 1, wherein the first scanning rate is 40 Hz at the maximum, in particular at least 1 Hz, and wherein in particular the second scanning rate is at least 500 Hz.

3. The eye tracking arrangement according to claim 2, wherein the first scanning rate is at least 5 Hz.

4. The eye tracking arrangement according to claim 2, wherein the second scanning rate is a maximum of 5 kHz.

5. The eye tracking arrangement according to claim 1, wherein the laser velocimeter comprises at least one surface emitter with integrated photodiode.

6. A smart glasses comprising an eye tracking arrangement according to claim 1.

7. The smart glasses according to claim 6, wherein the laser velocimeter comprises at least one laser source, which is arranged on a spectacle frame, which especially surrounds a spectacle lens, and/or on a spectacle temple and/or in a spectacle lens, and/or
   wherein the camera is arranged on the spectacle frame, and/or on the spectacle temple and/or in the spectacle lens.

8. The smart glasses according to claim 6, further comprising an input and/or output unit which is arranged to receive an input from the user and/or to output an output to the user, wherein the control device is arranged to actuate the input and/or output unit based on the tracked gaze direction of the eye.

9. A method of eye tracking of an eye, comprising the steps of:
   capturing an image of the eye by means of a camera,
   determining an absolute eye position of the eye based on the image of the eye,
   irradiating at least one wavelength modulated laser beam to the eye,
   determining a Doppler shift between the irradiated laser beam and a portion of the irradiated laser beam backscattered by the eye based on laser feedback interferometry of the irradiated laser beam and the portion backscattered by the eye, determining an eye velocity based on the Doppler shift, and tracking an eye movement of the eye based on the absolute eye position and the eye velocity, wherein tracking of eye movement is performed starting from an absolute eye position determined based on the image and by determining interpolated eye positions based on the determined eye velocity.

10. The method of claim 9, wherein images of the eye are captured at a first scanning rate to determine absolute eye positions at the first scanning rate, and wherein wavelength modulated laser beams are irradiated onto the eye at a second scanning rate to determine eye velocities at the second scanning rate.

11. The method according to claim 9, wherein determining the eye velocity is performed based on the following equation:

$$F_D = 2 v \cos(\alpha)/\lambda,$$

wherein:

v is the eye velocity;

$F_D$ is a Doppler frequency $F_D$ corresponding to the Doppler shift between the irradiated laser beam and the backscattered portion of the irradiated laser beam;

α is an angle between a direction of the irradiated laser beam and a tangent to an ocular surface which contacts the ocular surface at an impingement point where the irradiated laser beam impinges on the eye and which also is located in the plane spanned by a wave vector and a surface normal at the impingement point; and λ is a wavelength of the irradiated laser beam.

12. The method according to claim 11, further comprising the step of:

calibrating by determining the angle α, wherein the angle α is based on the image of the eye captured by means of the camera while the wavelength modulated laser beam is irradiated to the eye.

13. The method according to claim 11, further comprising the steps of:

determining a calibration eye velocity based on at least two consecutive images, calibrating by determining the angle α, wherein the angle α is determined based on the determined calibration eye velocity.

14. The method according to claim 9, further comprising the steps of:

determining a maximum eye velocity during an eye movement, and predicting an eye movement end position based on the maximum velocity.

15. The method according to claim 9, wherein at least two laser beams are irradiated onto the eye, and wherein the two irradiated laser beams are aligned such that an angle and/or a distance between a wave vector of each irradiated laser beam and at least one of two mutually orthogonal rotational axes of the eye, respectively, is not zero.

* * * * *